(12) United States Patent
Cohen et al.

(10) Patent No.: US 7,814,475 B2
(45) Date of Patent: Oct. 12, 2010

(54) GENERATING AND DEPLOYING CLIENT-SIDE RENDERED COMPONENTS

(75) Inventors: Yaron Cohen, Tel Aviv (IL); Ofer Feldman, Givaat Shmuel (IL); Guy Kirschbaum, Ra'anana (IL)

(73) Assignee: SAP Portals Israel Ltd., Ra'anana (IL)

( * ) Notice: Subject to any disclaimer, the term of this patent is extended or adjusted under 35 U.S.C. 154(b) by 1322 days.

(21) Appl. No.: 11/321,124

(22) Filed: Dec. 28, 2005

(65) Prior Publication Data
US 2007/0150883 A1   Jun. 28, 2007

(51) Int. Cl.
*G06F 9/44* (2006.01)
*G06F 15/16* (2006.01)
*G06F 3/00* (2006.01)

(52) U.S. Cl. .................. 717/168; 709/217; 715/744

(58) Field of Classification Search .............. 717/168, 717/174; 709/203, 217
See application file for complete search history.

(56) References Cited

U.S. PATENT DOCUMENTS

| | | | |
|---|---|---|---|
| 5,548,506 A | 8/1996 | Srinivasan | |
| 6,732,162 B1 * | 5/2004 | Wood et al. | 709/219 |
| 6,832,263 B2 * | 12/2004 | Polizzi et al. | 709/246 |
| 7,269,664 B2 * | 9/2007 | Hutsch et al. | 709/246 |
| 2001/0034771 A1 * | 10/2001 | Hutsch et al. | 709/217 |
| 2002/0038349 A1 * | 3/2002 | Perla et al. | 709/217 |
| 2002/0194267 A1 * | 12/2002 | Flesner et al. | 709/203 |
| 2003/0177075 A1 * | 9/2003 | Burke | 705/27 |
| 2003/0217061 A1 * | 11/2003 | Agassi et al. | 707/10 |
| 2003/0233425 A1 * | 12/2003 | Lyons et al. | 709/217 |
| 2004/0003096 A1 * | 1/2004 | Willis | 709/228 |
| 2004/0044755 A1 * | 3/2004 | Chipman | 709/223 |
| 2004/0225658 A1 * | 11/2004 | Horber | 707/9 |

OTHER PUBLICATIONS

Galic et al., "Access Integration Pattern Using IBM WebSphere Portal Server", Nov. 2001, p. 15, p. 92 and 93.*
"SAP iView Guidelines", May 2002, pp. 1-2. "http://www.sapdesignguild.org/resources/ma_guidelines_3/index.html".*
"Welcome to the Windows Forms QuickStart Tutorial", copyright 2002 Microsoft Corporation, retrieved Jun. 25, 2006, download from http:/samples.gotdotnet.com/quickstart/winforms//doc/toolbar.aspx, 2pgs.
"New on Java Boutique", Sunday, Jun. 25, Java Boutique, copyright 2006 Jupitermedia Corporation, retrieved Jun. 25, 2006, download from http://javaboutique.internet.com, 4pgs.

* cited by examiner

*Primary Examiner*—Wei Y Zhen
*Assistant Examiner*—Chih-Ching Chow
(74) *Attorney, Agent, or Firm*—Buckley, Maschoff & Talwalkar LLC

(57) ABSTRACT

In a networked portal system, a deployment engine is operative for automatically receiving client-side rendered components and preparing them for incorporation into a portal iView, they can be processed and displayed by a client's browser. In the deployment engine, the component is packaged, along with a descriptive document of the object and an iView, into an archive, and deployed to a server where it is registered into a portal.

15 Claims, 2 Drawing Sheets

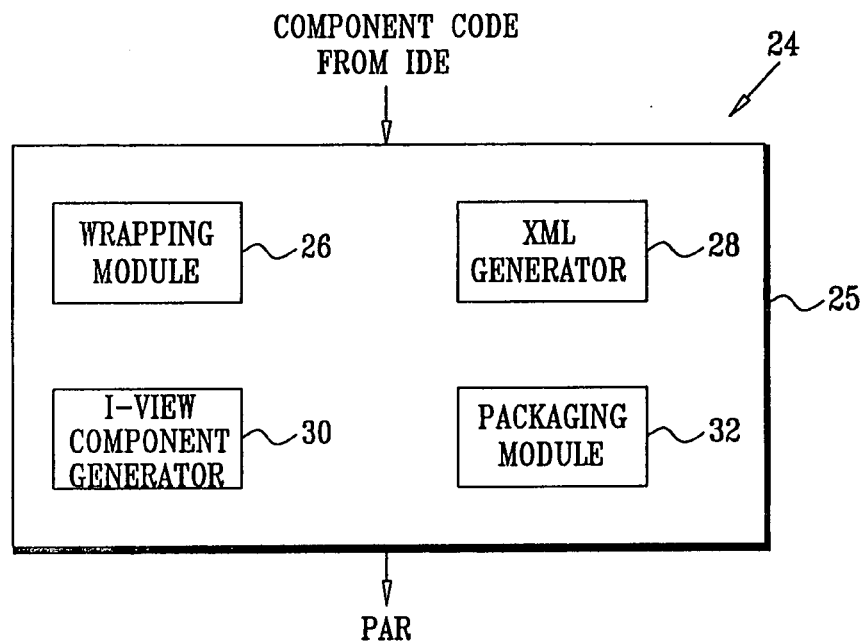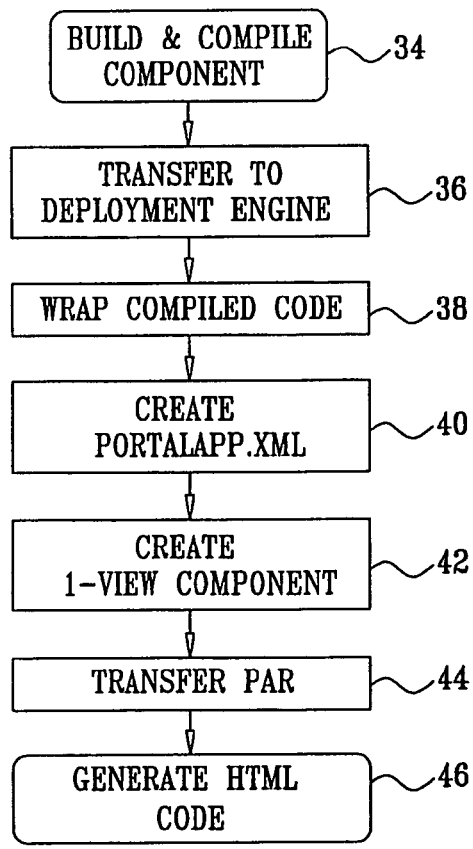

GENERATING AND DEPLOYING CLIENT-SIDE RENDERED COMPONENTS

BACKGROUND OF THE INVENTION

1. Field of the Invention

This invention relates to graphical presentation in a networked environment. More particularly, this invention relates to the generation and deployment of client-developed application objects for presentation in a browser in a portal-based network environment.

2. Description of the Related Art

Portal-based network environments have become increasingly important, particularly in large enterprises having a diversity of computer systems. For example, such environments can now be implemented using SAP NetWeaver® Portal technology, available from SAP AG of Walldorf, Germany. This technology supports integration and application platform requirements, and facilitates the development, deployment, and administration of enterprise services. NetWeaver uses "iViews" to incorporate essentially any kind of application, information or service that can be rendered in a Web browser frame. NetWeaver also provides users the capability of navigating among iViews using a Web browser, and thereby obtaining coherent, portal-based views of enterprise data. Additionally, NetWeaver facilitates the creation of new computer-implemented services for the enterprise.

More particularly, in addition to providing tools for creating and managing enterprise services, NetWeaver supports the design, implementation, and execution of applications that use those services, e.g., custom user interfaces.

Clients often desire to develop and deploy iView components. In the Windows™ environment, such components can be developed using a forms programming model provided by the Microsoft Corporation, Redmond Wash., which is available on the Internet.

In the Java™ environment, iView components can be added to a web page in the form of Java applets.

SUMMARY OF THE INVENTION

According to disclosed embodiments of the invention, an engine is provided to improve the development and deployment of objects or components that are rendered into a browser view, without the need to write specialized code. These objects are sometimes referred to herein as "client-side rendered components". In one aspect of the invention, the objects are included in an archive for subsequent retrieval.

In another aspect of the invention, a deployment engine is operative in a networked portal system for automatically receiving objects and preparing them for incorporation into a portal iView, after which they can be processed and displayed by a client's browser. In the deployment engine, the component is assembled with a descriptive document of the object and with an iView component, packed into an archive, and deployed to a server where it is registered into a portal as client-side rendered components.

An embodiment of the invention provides a computer-implemented method for automatically deploying objects into a networked display, which is carried out by receiving an object to be deployed as a client-side rendered component, incorporating the name and class of the object in a markup language document, creating a view component that enables embedding the object in a portal view that is displayable by a browser, and thereafter transmitting the object, the markup language document, and the view component to a server for registration therein.

An aspect of the method includes wrapping the object prior to transmitting the object.

In another aspect of the method transmitting includes incorporating the object, the markup language document, and the view component into an archive file, which can be a packed portlet archive file.

According to a further aspect of the method, the markup language document is a XML document.

An embodiment of the invention provides a computer software product for automatically deploying objects into a networked display, including a computer-readable medium in which computer program instructions are stored, which instructions, when read by a computer, cause the computer to receive an object that is to be deployed as a client-side rendered component, to incorporate the name and the class of the object in a markup language document, to create a view component that enables embedding the object in a portal view, such that the object is displayable by a browser in the portal view, and thereafter to transmit the object, the markup language document, and the view component to a server for registration therein.

An embodiment of the invention provides a development system for automatically deploying objects into a networked display, including a processor and a memory, wherein the processor executes a deployment engine in the memory. The deployment engine is operative to receive an object for deployment thereof as a client-side rendered component, to incorporate the name and the class of the object in a markup language document, to create a view component that enables embedding the object in a portal view, the object being displayable by a browser in the portal view, and thereafter to transmit the object, the markup language document, and the view component to a server for registration therein.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 2 is a detailed block diagram illustrating a deployment engine in the system shown in FIG. 1 in accordance with a disclosed embodiment of the invention; and FIG. 3 is a flow chart illustrating a method of generation and deployment of client-side rendered components in accordance with a disclosed embodiment of the invention.

DETAILED DESCRIPTION OF THE INVENTION

Figure 1:
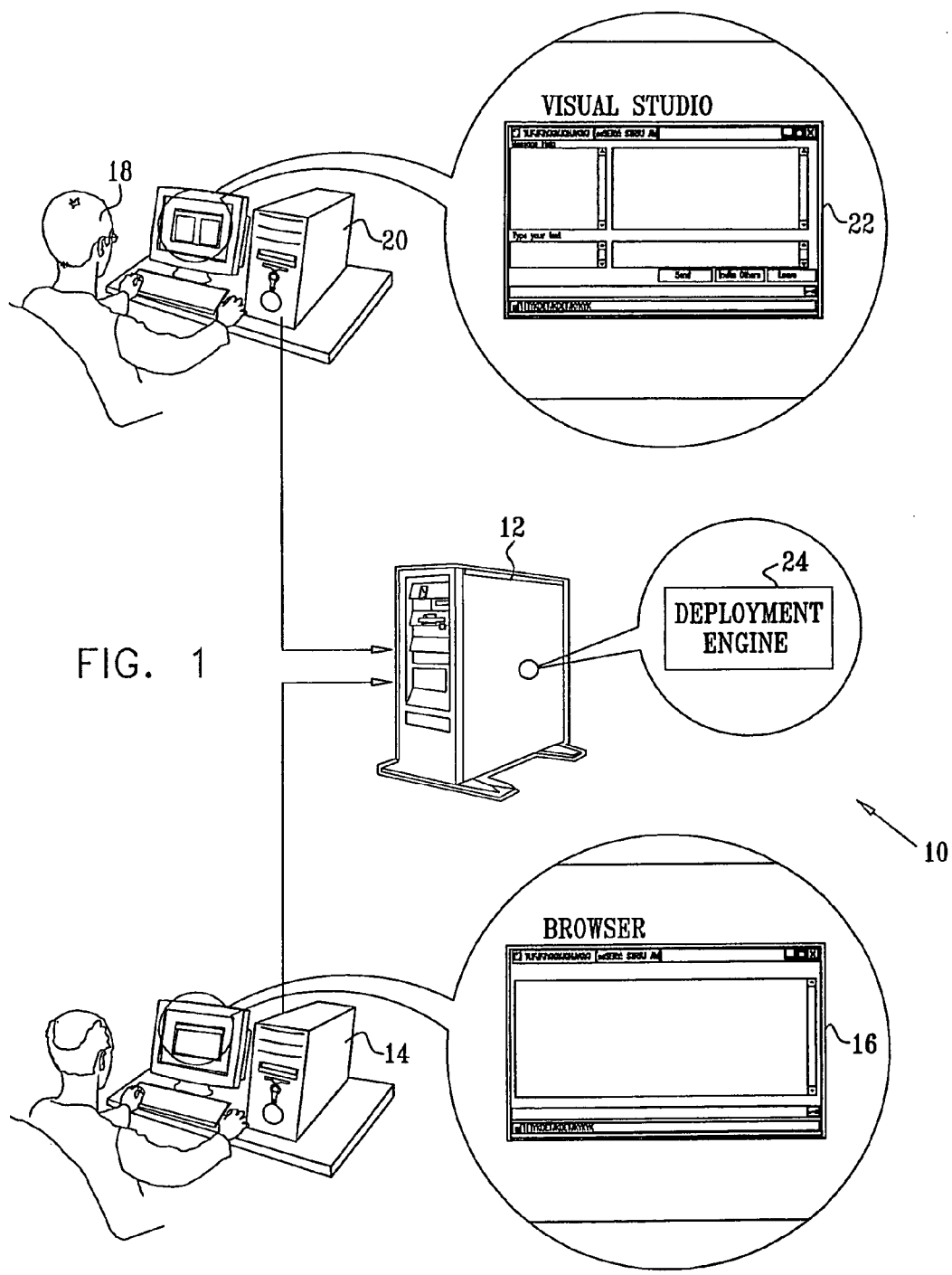
FIG. 1 is a high level diagram of a system that is constructed and operative for deployment and display of client-side rendered components in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

The embodiments described below are generally explained with reference to NetWeaver and the NetWeaver Portal environment. However, the principles of the invention can be applied to other platforms and environments, in which browser views employing specialized components are presented to a user. For example an add-in could be prepared for Visual Studio®, available from the Microsoft Corporation, which would deploy client-side rendered components into its Internet Services Manager (IIS).

Overview.

Turning now to the drawings, reference is initially made to FIG. 1, which is a high level diagram of a system 10 that is constructed and operative for deployment and display of client-side rendered components in accordance with a disclosed embodiment of the invention. The system 10 includes a processor or server 12 linked in a network to any number of client devices, represented by a client 14. The client 14 accesses the server 12 using a browser 16, which displays iViews of information stored on the server 12 or otherwise relayed to the client 14 by the server 12. The server 12 is preferably configured with NetWeaver software that renders desired iViews to the browser 16.

iViews comprise many types of components, for example, graphical objects, data objects, and applets. These components are typically created by a developer 18, using a development computer 20, typically running an integrated development application 22. The development application 22 can be Visual Studio, in conjunction with NET, which is Microsoft software used for interconnecting information, systems and devices. In this environment, ASP NET pages can be produced. These pages are text files (with a .aspx file name extension), consisting of code and markup information. They are dynamically compiled and executed on the server to produce a rendering to the requesting client browser or device.

The NetWeaver platform currently employs a portal development kit for .NET software, known as "PDK for .NET". This product enables programmers and developers to create ASP NET pages and deploy them into a NetWeaver portal as standard NetWeaver content. PDK for NET offers developers a framework for developing server-side rendered components, which can then be transferred to clients as raw hypertext markup language (HTML) code. However, PDK for NET does not support automatic deployment of the client-side rendered components. The present invention provides an improvement of the deployment engine presently available on the NetWeaver platform. Embodiments of the invention also provide an abstraction layer for the deployment of client-side components, in order to assure backward compatibility for future developments in the platform without need for rewriting code. In other words, a programmer does not write a specific block of code to handle the rendering of an object, e.g., a block of code signaling a browser that particular client-side rendered components should be located in particular positions. Instead, using aspects of the invention, the programmer only needs to state the need for particular client-rendered objects.

In the past, the process of deploying client-side rendered components, using existing products, involved operator intervention in order to accomplish the following steps: [0025] publishing the components through an external web server or internally, e.g., using Net-Weaver Portal; [0026] managing version control of the components; [0027] creating respective specialized iViews to host the client-side rendered components; and [0028] registering the specialized iViews for content administrator use.

In a typical conventional scenario, a developer would create a component in an integrated development environment for .NET, e.g., a .NET user control or an ActiveX® control compiled into a .DLL or .EXE file. Using standard deployment procedures, a portal administrator then would deploy the component to a SAP NetWeaver Portal using a deployment wizard. The portal administrator would include the NetWeaver Portal address and certain security details.

For example, the portal administrator could create an iView from a packed portlet archive file (PAR file). Portlets are Java-based pluggable user-interface components, which are managed by a portlet container. Portlets provide a presentation layer in order to process requests and generate dynamic content. A PAR file is an archive that contains the files needed in order to deploy a portlet into a portal Web application. Clients with sufficient privileges would then use the portlet as part of an iView.

Deployment Engine.

Continuing to refer to FIG. 1, according to an embodiment of the invention, an improved deployment engine 24 is used to deploy client-side components automatically. The deployment engine 24 is shown in FIG. 1 as being resident in the server 12. Alternatively, it can be installed in the development computer 20.

Reference is now made to FIG. 2, which is a detailed block diagram illustrating the deployment engine 24 (FIG. 1) in accordance with a disclosed embodiment of the invention. The deployment engine 24 is typically realized in a computer that includes a processor and a memory 25 that contains objects corresponding to the functional blocks depicted in FIG. 2. The functions of the blocks are explained in further detail below.

As explained below, the deployment engine 24 receives a client-side component, comprising compiled client code or a client object as input. A wrapping module 26 wraps the compiled code, for example, using the PDK for NET product. A XML generator 28 embeds the component's name and class into a XML file. An iView component generator 30 prepares an iView component. Once the client-side component has been received, the wrapping module 26, XML generator 28, and iView component generator 30 all operate automatically. Their outputs are assembled into a PAR file by a packaging module 32. The deployment engine 24 then transmits the PAR file to a portal, all substantially without human intervention.

Operation.

Reference is now made to FIG. 3, which is a flow chart illustrating a method of generation and deployment of client-side rendered components in accordance with a disclosed embodiment of the invention. The method is sometimes explained with reference to the embodiment of FIG. 1. However, it is not limited to this embodiment, and can be adapted to many environments by those skilled in the art.

At initial step 34, a developer creates and builds a client-side component using known methods, for example using Visual Studio to produce compiled code. Once the developer 18 has created and built the client-side rendered component, then, at step 36 it is submitted to the deployment engine 24.

Next, at step 38, the deployment engine wraps the compiled code, for example, using the PDK for NET product. This step is desirable for reasons of security, and for convenience of using previously constructed interfaces.

Next, at step 40 an extensible markup language (XML) file, known as a "portalapp.xml" file, is created. This step can be performed by the PDK for .NET product, which also embeds the component's name and class therein, so that the component can be appropriately installed in the file system of the server 12 (FIG. 1). An exemplary portalapp.xml file is shown in Listing 1. Inspection of Listing 1 reveals that the name of the client-side rendered component is "WindowsControlLibrary119.dll", and the class name for the user control is "WindowsControlLibrary119.UserControl1".

In order to complete the deployment of the client-side rendered component of Listing 1, another component is needed, an iView component, an example of which is shown in Listing 2. The iView component is created at step 42. The purpose of the iView component is to enable creation of a portal view in the server 12, e.g., an iView in which the deployed client-side rendered component can be embedded. It will be re-called that an iView is the low-level component for showing content inside a portal.

Next, at step 44, the wrapped, compiled code containing the client-side rendered component, the portalapp xml file, and the iView component are incorporated into an archive file, e.g., a PAR, and transferred to a portal by the deployment engine. After appropriate extraction from the PAR, the iView is then created in the server and stored in its file system as specified by the file portalapp.xml.

Control now proceeds to final step 46. The iView reads needed information from portalapp.xml file that was deployed together with the wrapped code containing the client side rendered component, and renders HTML code. The client-side rendered component is now fully deployed, and available for loading by a client's browser, e.g., Internet Explorer.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

Computer Program Listings

LISTING 1

```xml
<?xml version="1.0" encoding="utf-8" ?>
<application>
<application-config>
<property name="SharingReference"
    value="com.sap.portal.sc.framework" />
</application-config>
<components>
<component name="UserControl1">
<component-config>
<property name="ClassName"
    value="com.sap.portal.sc.framework.SCComponentLoader" />
</component-config>
<component-profile>
<property name="ComponentType"
    value="com.sapportals.portal.iview" />
<property name="com.sap.portal.sc.dll"
    value="WindowsControlLibrary119.dll">
<property name="personalization" value="NONE" />
<property name="administration"
    value="DIALOG-READ-ONLY" />
<property name="category" value="SC info" />
</property>
<property name="com.sap.portal.sc.class"
    value="WindowsControlLibrary119.UserControl1" >
<property name="personalization" value="NONE" />
<property name="administration"
    value="DIALOG-READ-ONLY" />
<property name="category" value="SC info" />
</property>
</component-profile>
</component>
</components>
<services />
</application>
```

LISTING 2

```
String dll_name =
request.getComponentContext( ).getProfile( ).get Property("com.sap.portal.sc.dll");
    String control_name =
request.getComponentContext( ).getProfile( ).getProperty("com.sap.portal.sc.class");
    IPortalComponentURI componentURI = request.createPortalComponentURI( );
    componentURI.setContextName(dll_name);
    String component_path = componentURI.toString( );
    String dll_path = request.getWebResourcePath( );
    String dll_full_name = portal_path + dll_path + "/" + dll_name;
    response.write("<object id=\"sc\" name=\"sc\" classid=\"" + dll_full_name + "#" +
control_name + "\" width=\"500\" height=\"500\"><param name=\"Text\"
value=\"Simple Control\"></object>");
```

The invention claimed is:

1. A computer-implemented method for automatically deploying objects into a networked display, comprising the steps of:

receiving an object to be deployed as a client-side rendered component at a networked portal system, said object having a name and a class; and after said receiving of said object having said name and said class:

(i) automatically incorporating said name and said class in a markup language document;

(ii) automatically creating a view component that enables an embedding of said object in a portal iView, which is displayable by a browser; and (iii) thereafter automatically transmitting said object, said markup language document, and said view component to a server where the view component is registered into a portal as client-side rendered components.

2. The method according to claim 1, further comprising the step of wrapping said object prior to performing said step of transmitting.

3. The method according to claim 1, wherein said step of transmitting comprises incorporating said object, said markup language document, and said view component into an archive file.

4. The method according to claim 3, wherein said archive file is a packed portlet archive file.

5. The method according to claim 1, wherein said markup language document is a XML document.

6. A computer software product for automatically deploying objects into a networked display, including a non-transitory computer-readable medium in which computer program instructions are stored, which instructions, when read by a computer, cause the computer to:

receive an object that is to be deployed as a client-side rendered component at a networked portal system, said object having a name and a class, and after said receiving of said object having said name and said class:

(i) automatically incorporate said name and said class in a markup language document, (ii) automatically create a view component that enables an embedding of said object in a portal iView, said object being displayable by a browser in said portal iView, and (iii) thereafter automatically transmit said object, said markup language document, and said view component to a server where the view component is registered into a portal as client-side rendered components.

7. The computer software product according to claim 6, wherein said instructions further cause said computer to wrap said object prior to a transmission of said object.

8. The computer software product according to claim 6, wherein said instructions further cause said computer to incorporate said object, said markup language document, and said view component into an archive file.

9. The computer software product according to claim 8, wherein said archive file is a packed portlet archive file.

10. The computer software product according to claim 6, wherein said markup language document is a XML document.

11. A development system for automatically deploying objects into a networked display, comprising:

a processor; and a memory, wherein said processor is operative to execute a deployment engine in said memory, said deployment engine being operative to:

receive an object for deployment thereof as a client-side rendered component from at a networked portal system, said object having a name and a class, and after said receiving of said object having said name and said class:

(i) automatically incorporate said name and said class in a markup language document, (ii) automatically create a view component that enables an embedding of said object in a portal iView, said object being displayable by a browser in said portal iView; and (iii) thereafter automatically transmit said object, said markup language document, and said view component to a server where the view component is registered into a portal as client-side rendered components.

12. The development system according to claim 11, wherein said deployment engine is operative to wrap said object prior to a transmission of said object.

13. The development system according to claim 11, wherein said deployment engine is operative to incorporate said object, said markup language document, and said view component into an archive file.

14. The development system according to claim 13, wherein said archive file is a packed portlet archive file.

15. The development system according to claim 11, wherein said markup language document is a XML document.

* * * * *